United States Patent
Christian

(10) Patent No.: US 11,570,170 B2
(45) Date of Patent: Jan. 31, 2023

(54) EMBEDDING GROUP-BASED COMMUNICATION SYSTEM CONTENT

(71) Applicant: Slack Technologies, Inc., San Francisco, CA (US)

(72) Inventor: Mark Christian, Benicia, CA (US)

(73) Assignee: Slack Technologies, LLC, San Francisco, CA (US)

( * ) Notice: Subject to any disclaimer, the term of this patent is extended or adjusted under 35 U.S.C. 154(b) by 122 days.

(21) Appl. No.: 17/026,826

(22) Filed: Sep. 21, 2020

(65) Prior Publication Data

US 2022/0094679 A1 Mar. 24, 2022

(51) Int. Cl.
*H04L 29/06* (2006.01)
*H04L 9/40* (2022.01)
*H04L 51/212* (2022.01)

(52) U.S. Cl.
CPC ........ *H04L 63/0853* (2013.01); *H04L 51/212* (2022.05); *H04L 63/104* (2013.01)

(58) Field of Classification Search
CPC ... H04L 63/0853; H04L 51/12; H04L 63/104; H04L 63/08; H04L 63/10; H04L 63/0807; H04L 63/065; H04L 51/212; H04W 12/06; H04W 12/08
See application file for complete search history.

(56) References Cited

U.S. PATENT DOCUMENTS

| | | | |
|---|---|---|---|
| 10,621,272 B1* | 4/2020 | Rose | H04L 51/30 |
| 10,917,401 B1* | 2/2021 | Mantin | H04L 63/1425 |
| 2013/0007891 A1* | 1/2013 | Mogaki | G06F 21/6218 726/27 |
| 2018/0287982 A1 | 10/2018 | Draeger et al. | |

OTHER PUBLICATIONS

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

"How Slack changed the way we work by putting the customer experience first", Repeat Customer Podcast, Episode 3, [online][retrieved May 9, 2019], Retrieved from the Internet: <URL: https://www.zendesk.com/resources/slack-customer-experience/, (2019) 13 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

(Continued)

*Primary Examiner* — Yogesh Paliwal
(74) *Attorney, Agent, or Firm* — Erise IP, P.A.

(57) ABSTRACT

Systems are disclosed for embedding group-based communication system content into an integrated application. A request for interactive embeddable content includes a unique identifier and an authentication token associated with a user of an integrated application. If the authentication token is valid, authorization information is provided to the integrated application. An interaction with the embeddable content is received from the user, and the group-based communication system is updated based on the interaction.

20 Claims, 6 Drawing Sheets

(56) References Cited

OTHER PUBLICATIONS

David Auerbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Ernie Smith, "Picking Up the Slack", Tedium, [online][retrieved May 9, 2019]. Retrieved from the Internet: <URL: https://tedium.co/2017/10/17/irc-vs-slack-chat-history/>. (dated Oct. 17, 2017) 13 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications-", Fujitsu Sci. Tech. J., 36, 2, (Dec. 2000) 154-161.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, is Valued at $1.1 Billion", The New York Times Blogs (BITS), Lexisnexis, https://advancelexis.com/api/permalink/3eb84b34-a8f9-4d7d-9573-89d9598a4963/?> (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Rebecca Walberg, "Email biggest office waste of time: survey", National Post, at FP10, Lexisnexis, https://advancelexis.com/api/permalink/96268e3f-26ad-48ac-a98f-6c39804ebded/?context=1000516, (dated Mar. 4, 2014) 2 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.eom/#/stewart-butterfield-the-big-pivot/, (dated Jan. 17, 2018) 27 pages.

* cited by examiner

EMBEDDING GROUP-BASED COMMUNICATION SYSTEM CONTENT

TECHNICAL FIELD

Embodiments of the invention generally relate to embedding group-based communication system content into an integrated application and, more particularly, to embedding interactive functionality associated with the group-based communication system.

Some web content platforms have the ability to display previews associated with hyperlinks. These previews are rendered by the web content platforms based on metadata associated with the hyperlinks. The metadata can be contained within Hypertext Markup Language (HTML) header data to provide information regarding how the preview should be displayed. Typically, the metadata includes a type for the preview such as "music," "video," "article," "book," or "profile." Preview metadata may also include a title and description for the link being previewed as well as an associated image to be displayed with the preview. However, such previews suffer from both a lack of access control and a corresponding lack of interactivity. Every user who views the preview sees the same content and cannot interact with it in any other than by accessing the underlying hyperlink. This significantly limits the usefulness of such previews.

SUMMARY

Embodiments of the invention address both of these problems by generating interactive previews of group-based communication system content in connection with integrated applications. In particular, in a first embodiment, the invention includes one or more non-transitory computer-readable media storing computer-executable instructions that, when executed by a processor, perform a method for embedding group-based communication system content in an integrated application, the method comprising: receiving, from the integrated application, a request for embeddable content corresponding to a group-based communication system data item, the request comprising: a unique identifier corresponding to the group-based communication system data item, and an authentication token associated with a user of the integrated application, in response to determining that the authentication token is valid for the user of the integrated application, evaluating authorization information for the user of the integrated application, providing, to the integrated application, the embeddable content corresponding to the group-based communication system data item, based at least in part on the authorization information for the user of the integrated application, wherein the embeddable content is interactive, receiving, from the user of the integrated application via the interactive application, an interaction with the embeddable content, and updating the group-based communication system based on the interaction.

In a second embodiment, the invention includes a method for embedding group-based communication system content in an integrated application, the method comprising: receiving, from the integrated application, a request for embeddable content corresponding to a group-based communication system data item, the request comprising: a unique identifier corresponding to the group-based communication system data item, and an authentication token associated with a user of the integrated application, in response to determining that the authentication token is valid for the user of the integrated application, evaluating authorization information for the user of the integrated application, providing, to the integrated application, the embeddable content corresponding to the group-based communication system data item, based at least in part on the authorization information for the user of the integrated application, wherein the embeddable content is interactive, receiving, from the user of the integrated application via the interactive application, an interaction with the embeddable content, and updating the group-based communication system based on the interaction.

In a third embodiment, the invention includes a system comprising at least one processor and at least one non-transitory memory storing computer executable instructions that when executed by the processor cause the system to carry out actions comprising: receiving, from an integrated application, a request for embeddable content corresponding to a group-based communication system data item, the request comprising: a unique identifier corresponding to the group-based communication system data item, and an authentication token associated with a user of the integrated application, in response to determining that the authentication token is valid for the user of the integrated application, evaluating authorization information for the user of the integrated application, providing, to the integrated application, the embeddable content corresponding to the group-based communication system data item, based at least in part on the authorization information for the user of the integrated application, wherein the embeddable content is interactive, receiving, from the user of the integrated application via the interactive application, an interaction with the embeddable content, and updating the group-based communication system based on the interaction.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
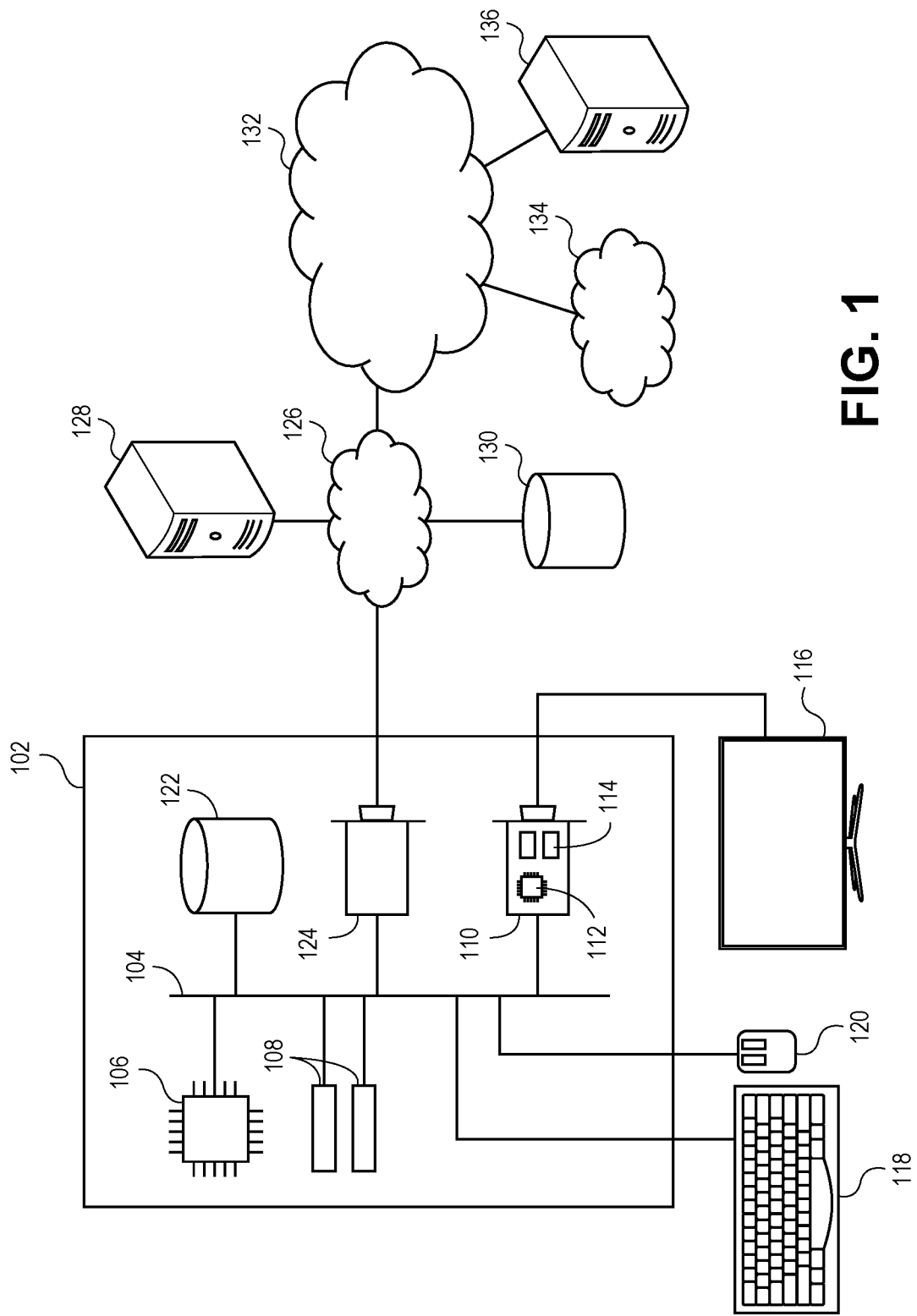
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

As used herein, the term "group-based communication system" refers to a collaborative communication system used within an organization. In some embodiments, the group-based communication system is a channel-based messaging platform. Within the group-based communication system, communication may be organized into "channels," each dedicated to a particular topic or set of users. Channels are generally long-lasting, persistent discussions of a particular topic. Members of a particular channel can post messages within that channel that are visible to other members of that channel together with other messages in that channel. Users may select a channel for viewing in order to see only those messages relevant to the topic of that channel without seeing messages posted in other channels on different topics. For example, a software development company may have different channels for each software product being developed, where developers working on each particular project can converse without bothering (or being bothered by) developers working on other projects. Because the channels are generally persistent and directed to a particular topic or group, users can quickly and easily refer back to previous communications for reference.

Communication data within a group-based communication system may include messages, queries, files (e.g., documents, spreadsheets, computer code, images, video, audio, and/or electronic contact information), mentions, users or user profiles, interactions (e.g., reactions, edits, deletions, and/or prioritizations such as by pinning or starring), tickets, channels, applications integrated into one or more channels, conversations (e.g., groups of messages that have been segmented as single units), workspaces (e.g., sets of channels, users, projects, tasks within an organization that may have their own sets of permissions and that may be organized substantially in line with an organization chart in some instances) or other data generated by or shared between users of the group-based communication system that are associated with an organization's communication data using the group-based communication system.

In some instances, the communication data may comprise data associated with a user (e.g., a user profile), including, but not limited to, a user identifier, one or more communication channel identifiers associated with communication channels to which the user has been granted access, one or more group identifiers for groups (or organizations, teams, entities, or the like) with which the user is associated, an indication of whether the user is an owner or manager of any communication channels, an indication of whether the user has any communication channel restrictions, a plurality of messages, a plurality of emoji, a plurality of conversations, a plurality of conversation topics, an avatar, an email address, a real name (e.g., Austin Author), a username (e.g., austin_a), a password, user preferences and/or settings, a time zone, a status, a token, and other user-specific information. In some embodiments, the group-based communication system may additionally or alternatively store permissions data associated with permissions of individual users of the group-based communication system. In some embodiments, permissions associated with an individual user can be mapped to, or otherwise associated with, an account or profile associated with user data. Permissions can indicate which users can communicate directly with other users, which channels a user is permitted to access, restrictions on individual channels, which workspaces the user is permitted to access, and restrictions on individual workspaces, for example. In some embodiments, the permissions can support the group-based communication system by maintaining security for limiting access to a defined group of users. In some such embodiments, such users can be defined by common access credentials, group identifiers, or other criteria, as described above.

In some embodiments, the group-based communication system can be partitioned into different workspaces, which can be associated with different groups of users. Each workspace can be associated with a group identifier and one or more user identifiers can be mapped to, or otherwise associated with, the group identifier. Users corresponding to such user identifiers may be referred to as "members" of the group. A workspace may comprise one or more channels that are unique to that workspace and/or one or more channels that are shared between one or more workspaces. In some embodiments, workspaces can be associated with one or more organization identifiers, which can be associated with organizations or other entities associated with the group-based communication system. In some embodiments, such data can be mapped to, or otherwise associated with, other types of data (e.g., user data, permission data, or channel data).

The subject matter of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Operational Environment for Embodiments of the Invention

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, via which other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also, on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the Institute of Electrical and Electronics Engineers (IEEE) 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over public Internet 132. Local network 126 is in turn connected to public Internet 132, which connects many networks such as local network 126, remote network 134 or directly attached computers such as computer 136. In some embodiments, computer 102 can itself be directly connected to public Internet 132.

Figure 2:
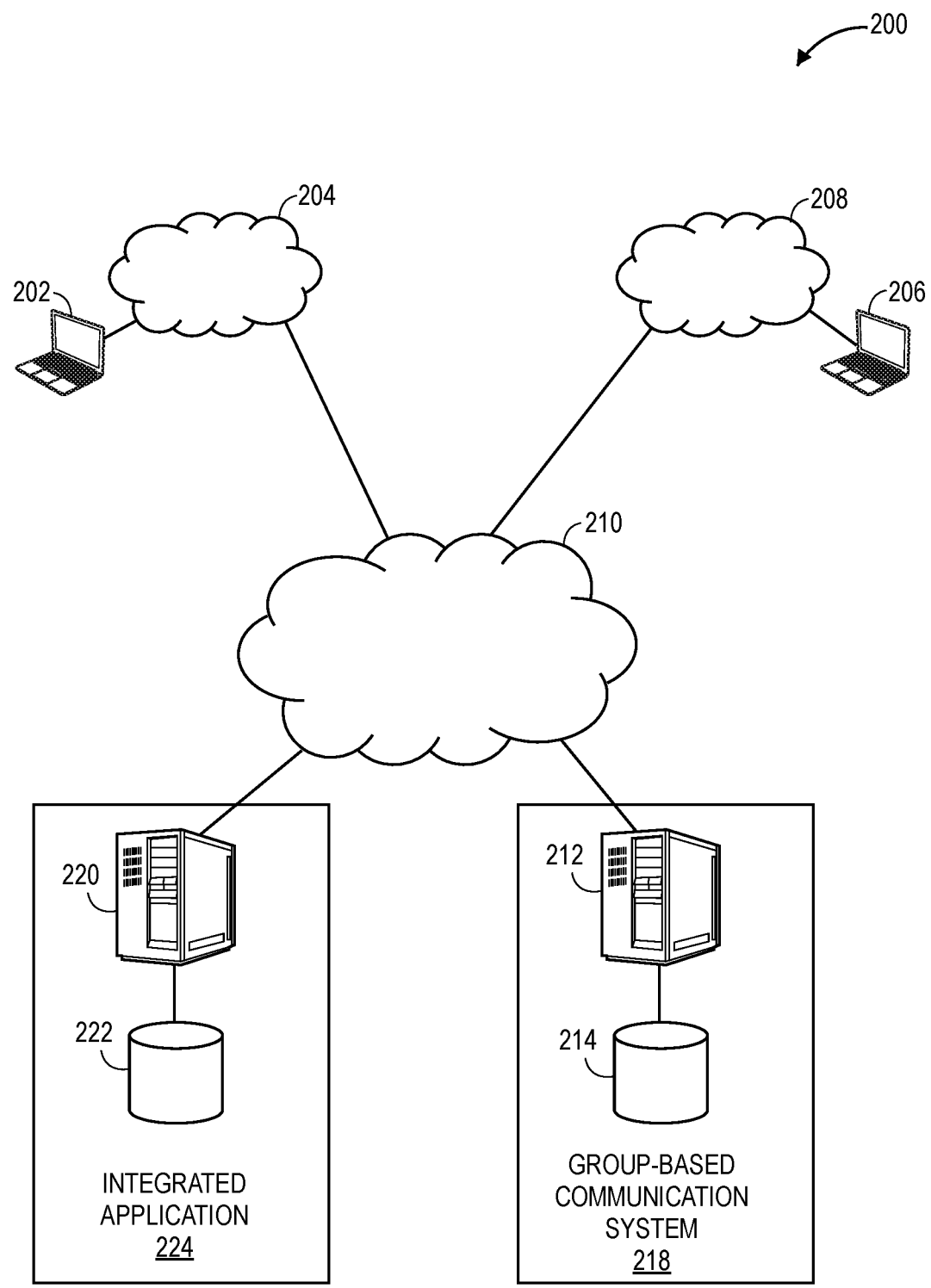
FIG. 2 depicts components of a system for carrying out embodiments of the invention.

Turning now to FIG. 2, an exemplary diagram illustrating components of a system for carrying out embodiments of the invention is depicted and referred to generally by reference numeral 200. System 200 provides a mechanism for embedding group-based communication system content into applications that are hosted by an organization separate and distinct from an organization that hosts or operates the group-based communication system. For example, system 200 may provide for embedding group-based communication system content into an online, collaborative document-editing service. It is understood that the online, collaborative document-editing service as described herein is described only as an example and any other application that can be used to share text and/or other content could be used for embedding group-based communication system content without departing from the scope of the invention as claimed.

As depicted in system 200, author device 202 is used by an authoring user to access and interact with various applications and associated data items within system 200. Author device 202 may be any form of computing device described above with respect to FIG. 1. For example, author device 202 may be a desktop computer, laptop computer, tablet computer, or smartphone. Author device 202 may access components of system 200 by way of author local network 204. Author local network 204 may be any kind of a wired or wireless data network, such as Ethernet as defined by any of the IEEE 802.3 family of standards, Wi-Fi as defined by the IEEE 802.11 family, or any mobile data network standard.

Also depicted is reader device 206, which may likewise be any form of computing device described above with respect to FIG. 1. By contrast with author device 202, reader device 206 is used by a user of system 200, who for the purposes of illustration may read group-based communication content that is authored by the user of author device 202. For example, such a reading user may be a colleague of the authoring user, who collaborates with the authoring user in preparing a document in the online, collaborative document-editing service. Reader device 206 may access components of system 200 by way of reader local network 208. Like author local network 204, reader local network 208 may be any kind of a wired or wireless data network as described above. Although author device 202 and reader device 206 are described as having distinct authoring and reading roles, it is understood that reader device 206 may also be used to author group-based communication system content similarly to author device 202. Similarly, an authoring user who uses author device 202 to author group-based communication system content may also use author device 202 to read group-based communication system content, whether previously authored by the authoring user herself or by any other user of the group-based communication system.

Group-based communication server 212 provides a front-end and user interface for group-based communication system 218 in system 200. For example, group-based communication server 212 may present a web interface with which users of group-based communication system 218 interact with group-based communication system messages and other content stored in group-based communication system repository 214. Users of system 200 may use devices such as author device 202 to interact with other elements of system 200 via the web browser of user device 202. Alternatively, or in addition, group-based communication server 212 may provide a direct client/server interface with which a user may use devices such as author device 202 to interact with elements of system 200 via dedicated software. For example, if user device 202 is a smartphone, the dedicated software may be in the form of a smartphone app. As yet another alternative, the user may use dedicated software in author device 202 to interact with other components of system 200, where the dedicated software interacts with group-based communication server 212 via the web interface of group-based communication server 212 or a web services application programming interface (API) associated with group-based communication server 212. Generally speaking, and as described in greater detail below, group-based communication system repository 214 stores data associated with group-based communication system 218. As depicted, group-based communication server 212 is directly connected to group-based communication system repository 214. However, in various embodiments, group-based communication system repository 214 may be connected via a network such as network 210. For example, group-based communication system repository 214 may be network-attached storage (NAS) or cloud storage.

Integrated application server 220 provides a front-end and user interface for integrated application 224 in system 200. For example, integrated application 224 may present a web interface with which users of integrated application 224 interact with data stored in integrated application repository 222. Users of system 200 may use devices such as author device 202 to interact with other elements of system 200 via the web browser of user device 202. Alternatively, or in addition, integrated application server 220 may provide a direct client/server interface via which a user may use devices such as author device 202 to interact with elements of system 200 via dedicated software. For example, if user device 202 is a smartphone, the dedicated software may be in the form of a smartphone app. As yet another alternative, the user may use dedicated software in author device 202 to interact with other components of system 200, where the dedicated software interacts with integrated application server 220 via the web interface of integrated application server 220 or a web services API associated with integrated application server 220. Generally speaking, and as described in greater detail below, integrated application repository 222 stores data associated with integrated application 224. As depicted, integrated application server 220 is directly connected to integrated application repository 222. However, in various embodiments, integrated application repository 222 may be connected via a network such as network 210. For example, integrated application repository 222 may be network-attached storage (NAS) or cloud storage.

The components of system 200 may be interconnected via network 210. For example, network 210 may be public Internet 132 as described in connection with FIG. 1. Alternatively, some or all of the components of system 200 may be interconnected via a local area network (LAN), wide area network, or virtual private network (VPN), which may in turn interconnect to other elements of the system via public Internet 132. In some embodiments author device 202 and reader device 206 connect directly to integrated application 224 and group-based communication system 218. In alternative embodiments, author device 202 and reader device 206 access information from group-based communication system 218 via integrated application 224. In further alternative embodiments, author device 202 and reader device 206 access information from integrated application 224 via group-based communication system 218.

Operation of Embodiments of the Invention

Figure 3:
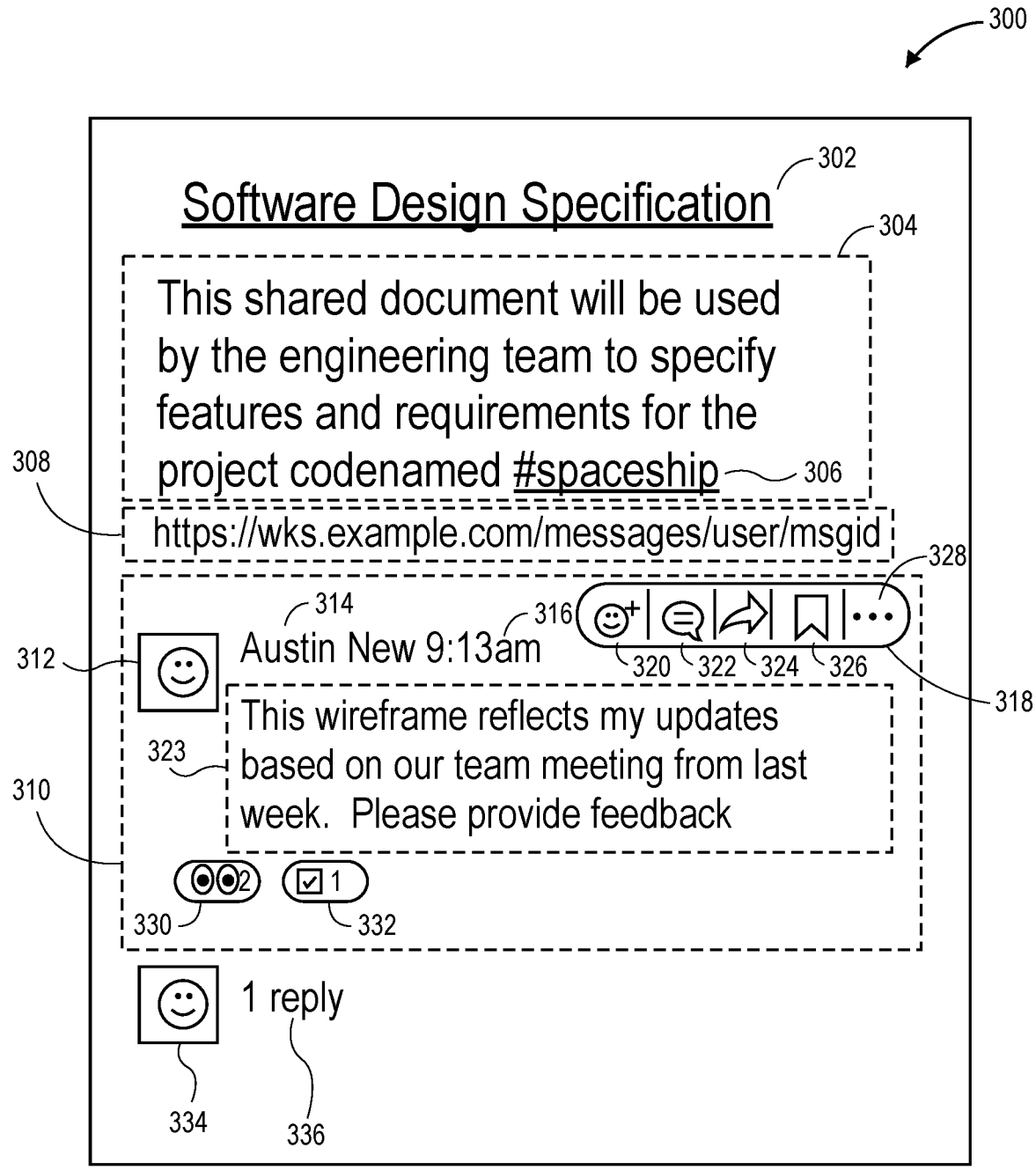
FIG. 3 depicts an exemplary user interface component for generating and interacting with a preview of a group-based communication system message.

Turning now to FIG. 3, an exemplary user interface component for generating and interacting with a preview message is depicted and referred to generally by reference numeral 300. Exemplary user interface component 300 provides a mechanism for composing a document in connection with an online, collaborative document-editing service. In the depicted example, multiple users collaborate to compose a software design specification document, entitled "Software Design Specification," as reflected in document title text 302. Document title text 302 could be any text that could be composed in connection with an online, collaborative document-editing service. Moreover, the application that is integrated with the group-based communication system(s) of the present invention is not limited to an online, collaborative document-editing service but can be any integrated application for sharing text and/or other content.

Text segment 304 illustrates content that may be shared between an authoring user and a reading user of the exemplary online, collaborative document-editing service. In one embodiment, user interface component 300 is rendered on a display associated with author device 202. In the depicted example, the authoring reader has initialized a new document and composed both document title text 302 as well as the content contained in text segment 304. In these embodiments, the authoring user has established authentication and authorization credentials with a provider of the integrated application on which the exemplary online, collaborative document-editing service is being provided. In alternative embodiments, the authoring user has opened a shared document into which document title text 302 and text segment 304 have already been composed. In either case, the authoring user has established credentials with the integrated application so that the authoring user is authorized to read the contents of the document title text 302 and the text segment 304.

In some embodiments, the text segment 304 may contain references to group-based communication system content such as channel reference 306 to group-based communication system channel named "#spaceship," which in FIG. 3 refers to a project codenamed "spaceship." In some embodiments, a user with access to the shared document may click or tap on the link associated with channel reference 306 and be redirected to a user interface associated with a corresponding group-based communication system, which will provide access to contents associated with the corresponding channel (in this cases the channel #spaceship) if the user has access to that channel in the group-based communication system. In alternative embodiments, clicking or tapping on channel reference will expand an embedded preview corresponding to the channel within the user interface of the integrated application as further described in connection with FIG. 4 below.

The composing user may also input into the integrated application a link to a message associated with the group-based communication system. As shown in FIG. 3, the authoring user has input message link 308 to a message in a group-based communication system. In order to render a preview of message link 308, the integrated application determines that message link 308 is a link to a message in a group-based communication system. In some embodiments, the integrated application has been pre-configured with configuration information specifying a set of trusted and integrated hosts and/or domains from which preview group-based communication system content should be obtained. By pre-configuring a set of trusted hosts and/or domains associated with trusted group-based communication systems, information security of the integrated application is enhanced.

On the other hand, pre-configuring trusted domains may be complicated, time-consuming, unscalable, or otherwise undesirable. In these cases, the integrated application can obtain preview information for any hyperlink that is input into the integrated application, and standards-based metadata associated with the hyperlink can instruct the integrated application how to render the embedded group-based communication system content. In some embodiments, metadata regarding how to preview content associated with a particular hyperlink may be obtained by making an API call to an application server, e.g., with an oEmbed API call. An oEmbed API call accepts parameters including the hyperlink to be previewed and returns a JavaScript object notation (JSON) object with details regarding how the hyperlink should be previewed. In alternative embodiments, the hyperlink may be visited (using the protocol associated with the hyperlink) and meta tags within the head portion of the response HTML provide details regarding previewing the hyperlink.

In FIG. 3, the authoring user has input message link 308 to a group-based communication system message that is rendered inside of a message box 310 corresponding to a preview of a group-based communication system message. In some embodiments, a group-based communication system message corresponding to message link 308 is rendered similarly to how the group-based communication system message would be rendered in a front-end client system that is native to the group-based communication system, including interactivity functionality and any back-end, third-party integrations with the group-based communication system. In some embodiments, this is accomplished as part of a pre-configuration setup process in which library code (such as a JavaScript library) for rendering group-based communication content is incorporated into the integrated application. In alternative embodiments, as part of rendering the preview content, script tags are processed and associated libraries (such as JavaScript libraries) for implementing group-based communication system functionality are accessed and executed in the front-end of the integrated application. In some embodiment, the integrated application causes the libraries to be executed in the browser of the user of the integrated application, such that only authorized users may access particular group-based communication system content.

In some embodiments, where a requesting device is requesting group-based communication system content from a group-based communication server, the requesting device may send a token for the group-based communication system. In some embodiments, the token is a cookie-dependent API token. A cookie-dependent API token is a token that is only accepted as valid by the group-based communication server if the token is sent alongside a valid authentication cookie for the particular browser session. A session-based authentication cookie is sent directly to the group-based communication server by the browser and inaccessible by the JavaScript running in the browser session. Metadata regarding the authentication cookie may be stored as a bundle with the cookie-dependent API token in the group-based communication server, and the cookie-dependent API token will be accepted as valid only if the cookie-dependent API token is received with the corresponding session-based authentication cookie associated with the cookie-dependent API token.

In some embodiments, the authentication cookie is presented to the client browser upon initial authentication of a browser session, and access to the authentication cookie is restricted from web application scripts. In some embodiments, the token is an API token stored locally in the client device or obtained through a delegated authorization framework such as OAuth.

Once the composing user has been authorized to receive preview content, the preview content is rendered by the integrated application, for example, on the display of the reader device 206. As shown in FIG. 3, this may be rendered as an avatar 312 associated with the author of the group-based communication message and an author name 314 of the author of the group-based communication system message. In some embodiments, a timestamp 316 is rendered to the right of the name 314 of the author of the message. In some embodiments, if a user taps or hovers the user's mouse over message text 323, a hover menu 318 is presented. In some embodiments, hover menu 318 contains reaction option 320, reply-in-thread option 322, share-a-message option 324, save option 326, and more-options option 328.

In some embodiments, if a user selects reaction option 320, the user may be presented with a user interface component presenting a number of emoji reactions. If the user selects one of the emoji reactions, the selected emoji reaction may be placed below the message with a number beside the reaction indicating a number of users that have reacted accordingly. Reaction 330 and 332 of FIG. 3 represent exemplary reactions. If the user selects reply-in-thread option 322, the user may type in a reply. If there are existing in-thread replies to a message, a corresponding link may be displayed such as reply link 336 indicating that so far there has been one in-thread reply so far. In some embodiments, replying-user avatar 334 is rendered, corresponding to the user that replied. In some embodiments, reply link 336 is rendered in such a way that clicking or tapping on reply link 336 takes the user out of the integrated application and into a front end of the group-based communication system.

Figure 4:
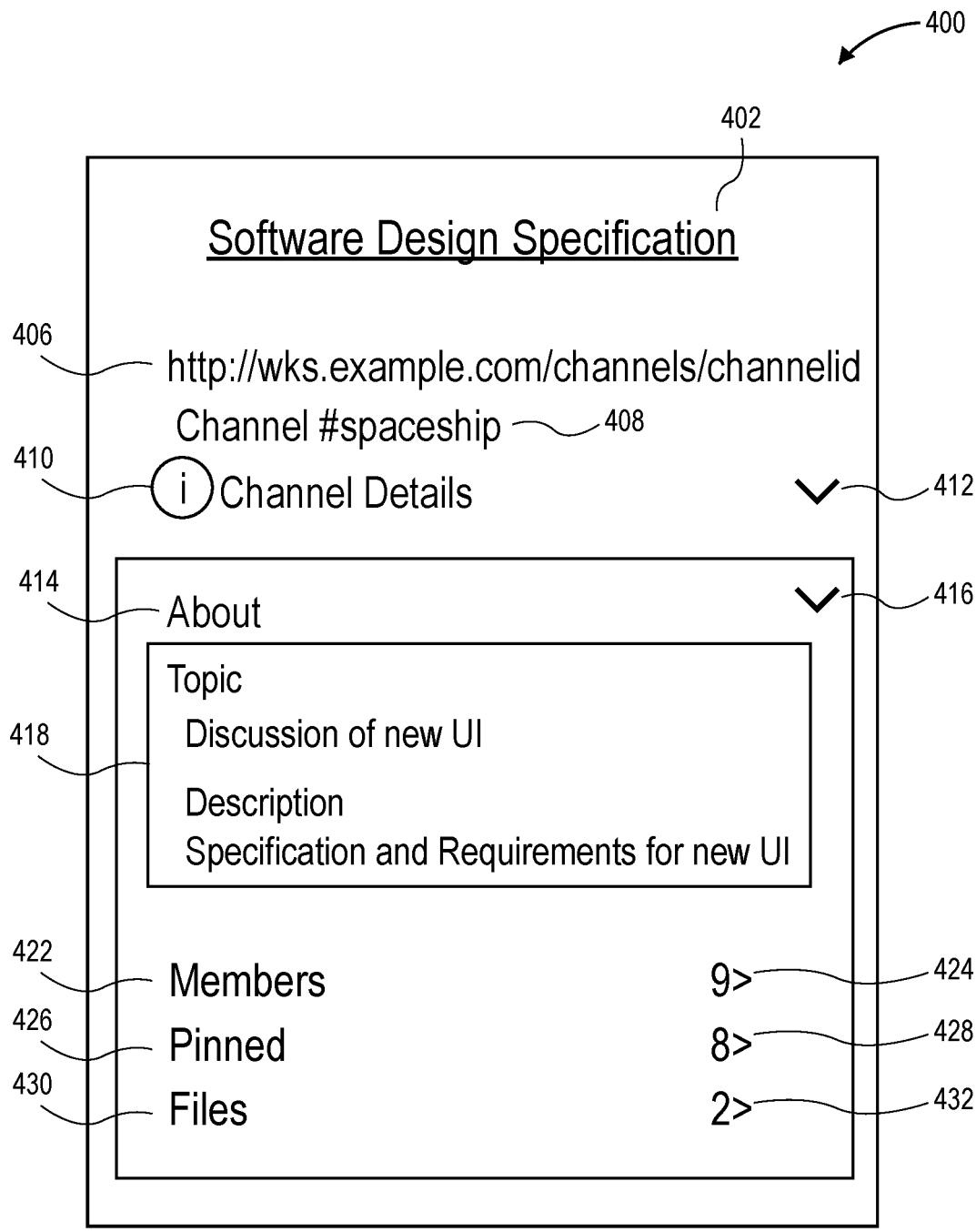
FIG. 4 depicts an exemplary user interface component for previewing a link to a group-based communication channel.

Turning now to FIG. 4, an exemplary user interface component for previewing a link to a group-based communication channel is depicted and referred to generally by reference numeral 400. User interface component 400 provides a mechanism for previewing a group-based communication system channel link embedded in an integrated application that is integrated with the group-based communication system. Similar to user interface component 300 above, user interface component 400 provides a mechanism for composing a document in connection with an online, collaborative document-editing service. In this embodiment, multiple users collaborate to compose a software design specification document, entitled "Software Design Specification," as reflected in document title text 402. Document title text 402 could be any text that could be composed in connection with an online, collaborative document-editing service. Moreover, the application that is integrated with the group-based communication system(s) of the present invention is not limited to an online, collaborative document-editing service but can be any integrated application for sharing text and/or other content.

In some embodiments, user interface component 400 may contain references to group-based communication system content such as channel reference link 406 to group-based communication system channel named "#spaceship," which refers to a project codenamed "spaceship." In some embodiments, inputting a link to a group-based communication system channel into an integrated application will cause the link to be rendered as a simple hyperlink to the channel within the group-based communication system. In this embodiment, clicking on the rendered link may redirect the clicking user out of the integrated application and to a front-end associated with the group-based communication system. In an alternative embodiment, inputting a link to a group-based communication system content item into an integrated application will cause the integrated application to send a request for embeddable content to the group-based communication system. In some embodiments, the request for content will include: (i) a channel identifier; (ii) a user identifier associated with the user that input the link; and (iii) one or more authentication token(s). If the group-based communication server determines that the communication token(s) are valid, the group-based communication server determines whether the user is authorized to receive channel information. If the user is authorized to receive channel information, the group-based communication server provides the requested embeddable preview information regarding the channel (channel details).

In some embodiments, a channel details label 410 is rendered on user interface component 400. In some embodiments, when channel details label 410 is initially rendered, it is rendered with an expandable panel arrow 412 that is initially collapsed. If a user clicks or taps the expandable panel arrow, an expandable panel 414 is expanded revealing additional expandable panel labels, including About panel 416 with About arrow 418. The channel details panel may also include Members panel 422 with Members arrow 424, Pinned panel 426 with Pinned arrow 428, and Files panel 430 with corresponding Files arrow 432. In some embodiments Members arrow 424, Pinned arrow 428, and Files arrow 432 each have a number to the left of the respective expandable arrow, indicating a corresponding number of items. That is to say as illustrated in FIG. 4, there are nine members, eight pinned messages, and 2 files in the channel. Upon expanding Members panel 422, a list of members become visible to the user of the integrated application. This has the benefit of allowing a user of the integrated application to view members of a particular channel so that, for example, if the user inputs a link to a message in the channel, the user will easily be able to see which users are in the channel and which users will therefore automatically have access to any channel messages that the user may include in the shared document. In some embodiments, the user of the integrated application can add additional members to the channel from the channel preview by, for example, right clicking on Members panel 422 and selecting an option of "add member" from a pop-up menu of options (not shown). In alternative embodiments, clicking or tapping on label 408 corresponding to "#spaceship," which is the name of the previewed channel will redirect the user of the integrated application to a group-based communication system front-end interface for viewing and editing the channel, and the user may then interact with the channel directly through the group-based communication system front-end. The user of the integrated application may also access directly the pinned messages in the channel and any associated files, directly from the integrated application, without needing to take the intermediate step of being redirected to a group-based communication system front-end.

In addition to rendering a link associated with a group-based communication system channel, a user of an integrated application may input a link to a user profile associated with a user of a group-based communication system. Such a rendering has the benefit of displaying profile information about a user of a group-based communication system and enabling a user of the integrated application to interact with an embedded preview of a group-based communication system user profile. In some embodiments, the user profile link may be input into an integrated application such as an online, collaborative document-editing service described in connection with FIGS. 3 and 4. In some embodiments, the user profile link preview is rendered with a user profile picture or avatar and a status associated with the user who is the subject of the user profile. In addition to the status, which may be "out of the office" or "in a meeting" there may be a date or time for example corresponding to when the user will be out of the meeting. In some embodiments, this embedded preview updates within the integrated application in near real time so that a user of the integrated application is presented with an updated status when associated backend information in the group-based communication system is updated.

Figure 5:
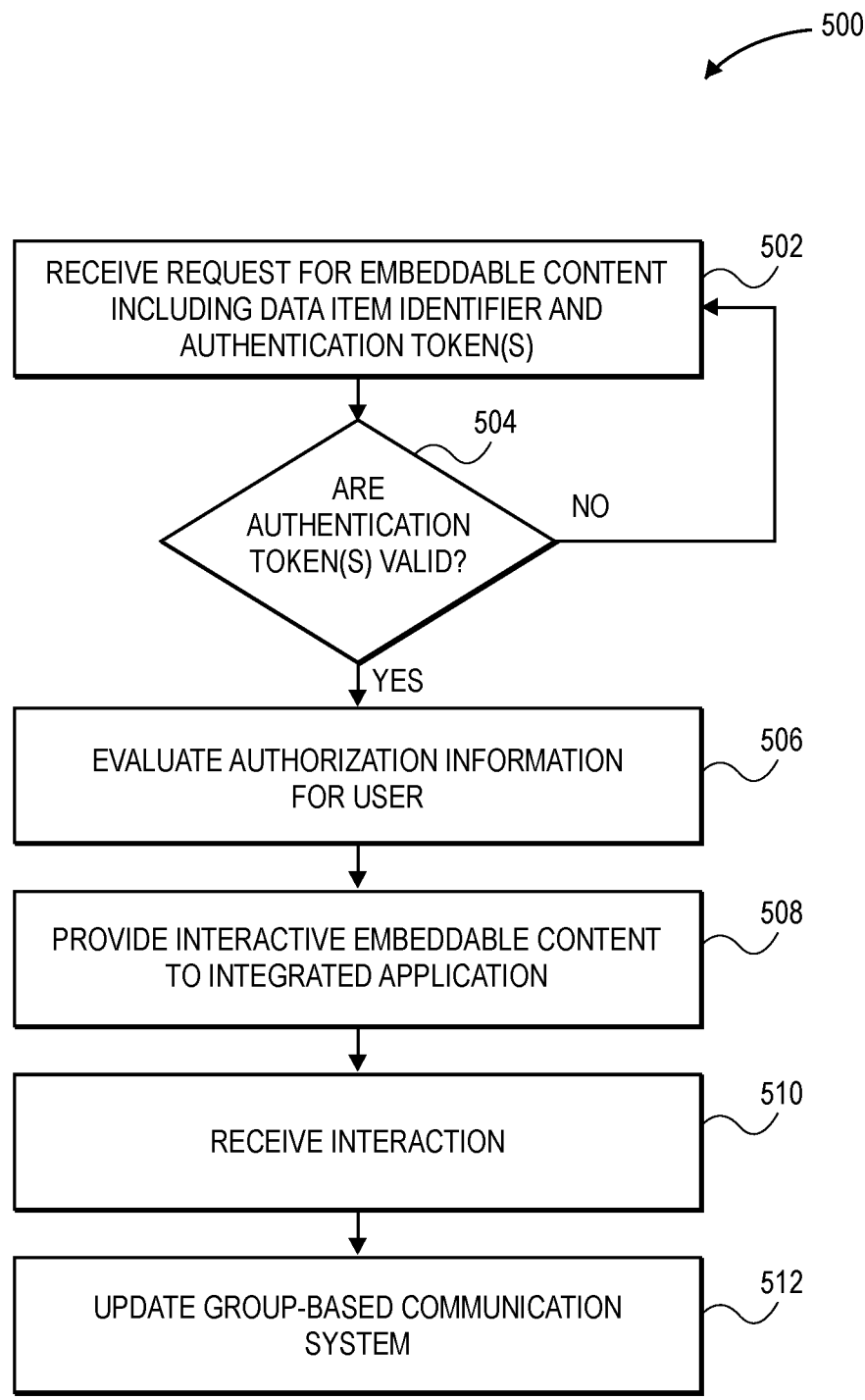
FIG. 5 depicts an exemplary flowchart illustrating the operation of a method in accordance with one embodiment of the invention.

Turning now to FIG. 5, an exemplary flowchart illustrating the operation of a method in accordance with one embodiment of the invention is depicted and referred to generally by reference numeral 500. Initially, at step 502, a group-based communication server receives a request for embeddable content including a data item identifier and authentication token(s). In some embodiments, an integrated application is integrated with the group-based communication system. In one embodiment, the integrated application may be an online, collaborative document-editing service but is not so limited and may be any integrated application for sharing text and/or other content between the integrated application and the group-based communication system. In some embodiments, receiving the request may involve receiving a universal resource locator (URL) corresponding to a group-based communication system content item from the integrated application.

Next, at test 504 it is determined whether the provided authentication token(s) are valid. In some embodiments, a user of the integrated application has provided authentication credentials to the integrated application for authenticating the user to the integrated application. In some embodiments, the same authentication credentials may be used to authenticate the user to the integrated group-based communication system. In other embodiments, separate sets of authentication credentials are provided by the user for authenticating to the integrated application and to the integrated group-based communication system. In some embodiments, authentication credentials include a username and a password. In some embodiments, the provided authentication token(s) are API tokens stored in an application repository associated with the integrated application or obtained through a delegated authorization framework such as OAuth. If the authentication tokens are valid, the process proceeds on step 506, otherwise the process loops back to step 502.

Next, at step 506 the group-based communication system evaluates the authorization information for the user who has requested access to embeddable group-based communication system content. In some embodiments, the authorizations are native authorizations associated with the group-based communication system. For example, users that are members of a private channel may be able to access messages in that channel, and users that are not members of the private channel may not have access to messages contained within the private channel. In the case where the requesting user is requesting access to a group-based communication system content item to which the user does not have access, the user's request may be denied. On the other hand, if the requesting user is authorized to access the group-based communication system content item, access may be permitted.

Next the process proceeds on to step 508 where the group-based communication system provides interactive embeddable content to the integrated application. If the requesting user is authorized to view the requested group-based communication system content item, the associated preview content will contain actual details corresponding to the content item, such as message contents in the case of a group-based communication system message. Broadly speaking, a variety of authorizations are contemplated based on the requesting user. For example, in addition to the "view" permission disclosed above, separate permissions may be provided that enable the user to edit the message, delete the message, respond to the message, react to the message, start a thread responsive to the message, respond to a poll contained in the message, or view information (such as calendar information) associated with the author of the message. Separate permissions may be provided for any action that can be taken relative to a message in the group, or actions may be grouped with a smaller set of related permissions. The preview data may be processed in a way consistent with the general operation of the integrated application and may reflect the permissions of the viewing user. In the example of an online, collaborative document-editing service, the preview content may be processed as inline content to be displayed in a shared document at the point in the document where the requesting user input a hyperlink into the shared document.

Next, at step 510, the integrated application receives an interaction from a user interacting with the integrated application and the rendered interactive embeddable content based on the permissions of the interacting user. For example, in the context of a group-based communication system message, if the requesting user is the user who initially created the group-based communication system message, the requesting user may interact with the message by editing the text of the message. In such a case, the requesting user may similarly delete the message from the group-based communication system. If the requesting user is not the creator of the message but nevertheless has access to the message, by virtue of having appropriate authorizations, the requesting user may not edit the message or delete it from the group-based communication system, but the requesting user may read the message and, in some embodiments, provide a reaction or otherwise interact with the message. One possible interaction would be to add an emoji reaction such as a thumbs-up to indicate approval of the message; another would be to reply to the message or to direct message (DM) the message author. As described above, any interaction with the message is contemplated as being within the scope of the invention. Finally, at step 512 in response to receiving the interaction with the embedded group-based communication system content item, the group-based communication system updates data in the group-based communication system repository corresponding to the interaction such that the results of the interaction is viewable in the group-based communication system. For example, if the interacting user added a reaction emoji, a channel member viewing the message in the group-based communication system would see the reactions, and if the interacting user replied to the message, that reply message would be viewable in the group-based communication system like any other group-based communication system message.

Figure 6:
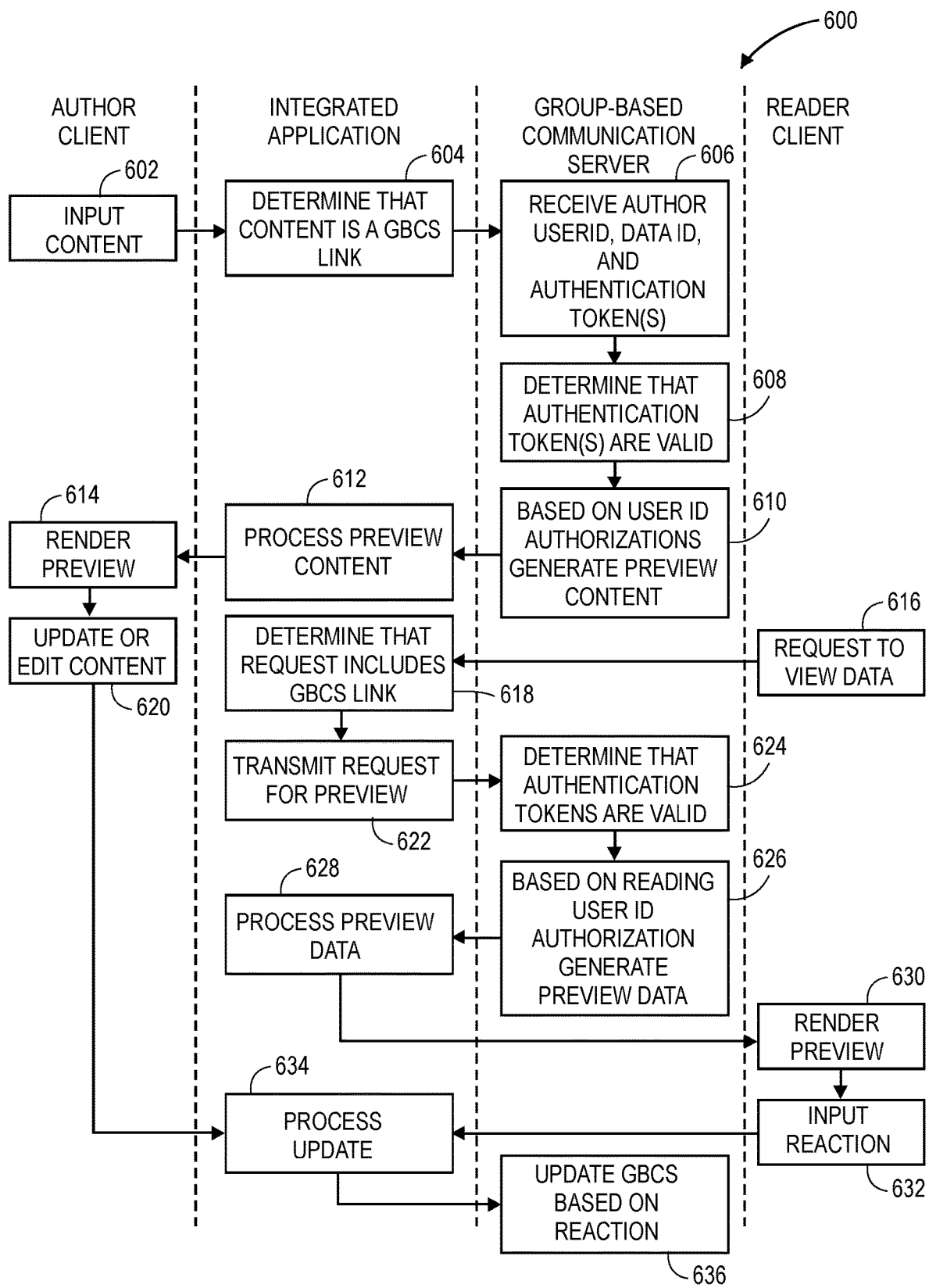
FIG. 6 depicts an exemplary swim lane diagram for illustrating the operation of a method in accordance with one embodiment of the invention.

Turning now to FIG. 6, an exemplary swim lane diagram is depicted illustrating the operation of a method in accordance with one embodiment of the invention. The swim lane diagram is referred to generally by reference numeral 600. The process begins at step 602 with the author client (such as author device 202) of the authoring user inputting content into an integrated application. In some embodiments, the integrated application is integrated with a group-based communication system of the present invention. In another embodiment, the integrated application may be an online, collaborative document-editing service but is not so limited and may be any integrated application for sharing text and/or other content between the integrated application and the group-based communication system. In some embodiments, inputting content at step 602 may involve entering formatted text or other structured content. In one embodiment, the authoring user employs the author client to input a URL corresponding to a group-based communication system content item into the integrated application.

At step 604, the integrated application determines that the content input at step 602 was a link to content within a group-based communication system. This determination may be made in a number of ways. One way is to preconfigure the integrated application such that certain host names or domains are known to be associated with one or more group-based communication systems. Another way is to detect that the content that was input at step 602 is a hyperlink and to establish a connection to a web server at an address associated with the hyperlink, make a request for a page, and parse the response. In some embodiments, the response from the web server may contain metadata that establishes a type of application that is hosted at the address associated with the hyperlink. In some embodiments, the type of application may be group-based communication system. Yet another way is to present the address associated with the input hyperlink to an endpoint associated with a trusted service for providing metadata about an application or service provided at a particular address associated with a hyperlink. In such an embodiment, the trusted service may parse the address associated with the input hyperlink, look up the address in an associated mapping of addresses to types, and respond with a type of application corresponding to the address associated with the hyperlink. In some embodiments, a portion of the hyperlink corresponds to a data identifier uniquely identifying a data item in the group-based communication system to which the integrated application is integrated. In one embodiment, the hyperlink comprises a protocol, a domain, and a path for connecting to the group-based communication system. In this embodiment the protocol may be https, the domain workspace1.example.com, and the path such as /messages/userid/messageid. A portion of the path may correspond to a message identifier (in this case messageid). Embodiments of the invention may use one or more of these ways depending on the integrated application, the group-based communication system, and the software running on the user's device.

In some embodiments, the trusted server may respond with a type of application corresponding to a group-based communication system. In some embodiments, the authoring user has provided authentication credentials to the integrated application for authenticating the authoring user to the integrated application. In some embodiments, the same authentication credentials may be used to authenticate the authoring user to the integrated group-based communication system. In other embodiments, separate sets of authentication credentials are provided by the authoring user for authenticating to the integrated application and to the integrated group-based communication system.

At step 606, the group-based communication system receives a user identifier associated with the authoring user, a data identifier associated with an item of group-based communication system contents, and one or more authentication tokens. These tokens may be obtained in connection with presenting valid authentication credentials. In some embodiments, the tokens are cookie-dependent API tokens. A cookie-dependent API token is a token that is only accepted as valid by a group-based communication system if the token is sent alongside a valid authentication cookie for the particular browser session. A session-based authentication cookie is sent directly to a group-based communication server by the browser and inaccessible by the JavaScript running in the browser session. As described above, metadata regarding the authentication cookie may be stored as a bundle with the cookie-dependent API token in the group-based communication server, and the cookie-dependent API token will be accepted as valid only if the cookie-dependent API token is received with the corresponding session-based authentication cookie associated with the cookie-dependent API token. In some embodiments, the authentication cookie is presented to the client browser upon initial authentication of a browser session (using the relevant authentication credentials), and access to the authentication cookie is restricted from web application scripts. In some embodiments, the token is an API token stored locally in the author client or obtained through a delegated authorization framework such as OAuth.

At step 608, the group-based communication system determines that the authentication token(s) are valid. In some embodiments, in which the author client has authenticated to the integrated application and not yet to the integrated group-based communication system, valid authentication tokens(s) and/or session cookies will not be available. In this case, the group-based communication system will not be able, at step 608, to determine that the authentication token(s) are valid. In this case, the group-based communication system may provide an error message to the integrated application or simply not respond for a period of time, upon which the integrated application may initiate a process of obtaining authentication credentials from the authoring user. Once properly authenticated, the authoring user can cause the integrated application to provide valid authentication token(s) and the group-based communication system can determine that the provided authentication token(s) are indeed valid at step 608.

At step 610, the group-based communication system generates preview content for the requested group-based communication system content item based on authorizations associated with the received authoring user identifier. In some embodiments, the authorizations are native authorizations associated with the group-based communication system. For example, users that are members of a private channel may be able to access messages in that channel, and users that are not members of the private channel may not have access to messages contained within the private channel. Where the authoring user has input a link to a message to which the authoring user does not have access, the generated preview content may simply indicate that a message preview is not available because the authoring user does not have access to the group-based communication system content item. On the other hand, if the authoring user is authorized to access the group-based communication system content item, the generated preview content will correspond to the actual content of the content item, such as the actual content of a particular group-based communication message.

In addition to a native authorization scheme, an administrator of a group-based communication system or author of a group-based communication system content item may provide supplemental authorization information that may override the native authentication scheme. For example, an administrator or author could designate a single group-based communication system message (even one in a private channel) as globally readable or readable to any user who has provided valid authentication credentials to be able to access content within the integrated application. In the online, collaborative document-editing service example, this would mean that any user who is granted authorization to read a particular shared document in the integrated collaborative editing service would be able to read the preview associated with any group-based communication system content item that the authoring user inputs into the collaboratively edited document. In some embodiments, for which the authoring user inputs a hyperlink to a group-based communication system content item, at the time of the initial preview, the authoring user is prompted to provide supplemental authorization information in addition to the native authorization scheme. In this embodiment, the authoring user may specify a number of supplemental authorizations, including the above example in which any valid user with access to the shared document will also have at least read access to the particular group-based communication system content item. Alternatively, the authoring user may provide an authorization for unauthenticated users. For example, users who do not belong to the group-based communication system may be authorized to view a read-only, non-interactive version of the interactive content.

At step 612, the integrated application processes the preview data that was generated by the group-based communication system in step 610. As noted above, the generated preview content will depend on the authorizations of a viewing user of the group-based communication system content. At step 612, the authoring user is the initial viewing user. Accordingly, if the authoring user has access to view the content item associated with the hyperlink that the authoring user input at step 602, the generated preview content (that was generated at step 610) will contain actual details corresponding to the content item. The preview data may be processed in a way consistent with the general operation of the integrated application. In the example of an online, collaborative document-editing service, the preview content may be processed as inline content to be displayed in a shared document at the point in the document where the authoring user input the corresponding hyperlink. At step 614, the preview is rendered on the display of the author client consistent with rendering styles associated with the integrated application.

At step 620, the authoring user may update or edit the rendered content. In various embodiments, the rendered content may correspond to a group-based communication system content item as input by the authoring user in step 602 as a hyperlink. Various types of content items include a group-based communication system message, a group-based communication system channel, and a group-based communication system user profile. In the context of a group-based communication system message, if the authoring user is the user who initially created the group-based communication system message (a creating user), the authoring user may edit the text of the message. A creating user may similarly delete the message from the group-based communication system. If the authoring user is not a creating user of the message but nevertheless has access to the message, either by way of native or supplemental authorization, the authoring user may not edit the message or delete it from the group-based communication system. The authoring user may, however, read the message and, in some embodiments, provide a reaction or otherwise react to the message. As used herein a reaction includes hovering over the message and clicking or tapping one of the options in hover menu 318 of FIG. 3. One possible reaction would be reaction 330 (eyes) of FIG. 3 to indicate that the authoring user had looked at the message.

If an edit, deletion, or reaction is carried out by the authoring user at step 620, the integrated application processes the corresponding update at step 634. In some embodiments, the preview content provided by the group-based communication system at step 610 includes software libraries for processing group-based communication system content. In one embodiment, the software libraries include JavaScript libraries containing functionality for rendering and updating group-based communication system content. In these embodiments, the integrated application functions as a front-end for the group-based communication system, enabling users of the integrated application to interact with group-based communication system content items, by replying and reacting to corresponding group-based communication system messages, for example. Finally, based on the details of the update(s) processed at step 634, the contents of the group-based communication system are updated at step 636.

Once the authoring user has provided some content into the integrated application, a reader client may consume the content. In embodiments, the reader client makes a request to view data within the integrated application. In some embodiments, the reader client may provide authentication credentials. In alternative embodiments, an anonymous reading user may read some information in the integrated application without providing authentication credentials. In some embodiments, the reading user's request to view data (step 616) may involve a request to open a shared document containing a link to a group-based communication system content item.

Next at step 618, the integrated application determines that the content requested by the reader client at step 616 is a link to content within a group-based communication system. As noted in connection with step 604, this determination may be made in a number of ways. In some embodiments, the reading user has provided authentication credentials to the integrated application for authenticating the reading user to the integrated application. In some embodiments, the same authentication credentials may be used to authenticate the reading user to the integrated group-based communication system. In other embodiments, separate sets of authentication credentials are provided by the reading user for authenticating to the integrated application and to the integrated group-based communication system.

At step 622, the integrated application transmits a request for an embedded preview of group-based communication system content. At step 624, the group-based communication server, determines that the authentication token(s) are valid similarly to step 608 above. At step 626, the group-based communication server generates preview content for the requested group-based communication system content item based on authorizations associated with a user identifier for the reading user. In some embodiments, the authorizations are native authorizations associated with the group-based communication system. In other embodiments, a creator of content associated with the integrated application may have overridden the native authorizations at the time of creating content within the integrated application.

At step 628, the integrated application processes the preview data that was generated by the group-based communication system in step 626. The generated preview content will depend on the authorizations of the reading user. If the reading user has access to view the content item, the generated preview content (that was generated at step 626) will contain actual details corresponding to the content item. The preview data may be processed in a way consistent with the general operation of the integrated application. In the example of an online, collaborative document-editing service, the preview content may be processed as inline content to be displayed in a shared document at the point in the document where the authoring user input the corresponding hyperlink. At step 630, the preview is rendered on the display of the reader client consistent with rendering styles associated with the integrated application.

At step 632, the reading user inputs a reaction. Inputting a reaction may include hovering over a group-based communication system message and clicking or tapping one of the options in hover menu 318 of FIG. 3. One possible reaction would be reaction 332 (check mark) of FIG. 3 to indicate that the reading user approved the displayed message. Finally, based on the details of the reaction processed at step 634, the contents of the group-based communication system are updated at step 636 to reflect the interaction such that members of the group-based communication can see the viewing user's response to the message.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer-executable instructions that, when executed by a processor, perform a method for embedding group-based communication system content in an integrated application, the method comprising:

receiving, from a third-party integrated application that is separate and distinct from a group-based communication system hosting the group-based communication system content, a request for embeddable content corresponding to a group-based communication system data item, the request comprising:

a unique identifier corresponding to the group-based communication system data item; and an authentication token associated with a user of the third-party integrated application;

in response to determining that the authentication token is valid for the user of the third-party integrated application, evaluating authorization information for the user of the third-party integrated application; and providing, for display in a user interface of the third-party integrated application, the embeddable content corresponding to the group-based communication system data item, based at least in part on the authorization information for the user of the third-party integrated application, wherein the embeddable content is interactive content.

2. The non-transitory computer-readable media of claim 1, wherein the group-based communication system data item is a group-based communication system message.

3. The non-transitory computer-readable media of claim 1, wherein the method further comprises:
receiving, from the user of the third-party integrated application via the third-party integrated application, an interaction with the embeddable content; and
updating the group-based communication system based on the interaction.

4. The non-transitory computer-readable media of claim 1, wherein the group-based communication system data item is a group-based communication system channel.

5. The non-transitory computer-readable media of claim 1, wherein the unique identifier comprises: a protocol, a domain, and a path that uniquely identifies the group-based communication system content.

6. The non-transitory computer-readable media of claim 1, wherein the authentication token comprises an API token.

7. The non-transitory computer-readable media of claim 6, wherein the authentication token further comprises a session cookie.

8. A method for embedding group-based communication system content in an integrated application, the method comprising:
receiving, from a third-party integrated application that is separate and distinct from a group-based communication system hosting the group-based communication system content, a request for embeddable content corresponding to a group-based communication system data item, the request comprising:
a unique identifier corresponding to the group-based communication system data item; and
an authentication token associated with a user of the third-party integrated application;
in response to determining that the authentication token is valid for the user of the third-party integrated application, evaluating authorization information for the user of the third-party integrated application; and
providing, for display in a user interface of the third-party integrated application, the embeddable content corresponding to the group-based communication system data item, based at least in part on the authorization information for the user of the third-party integrated application,
wherein the embeddable content is interactive content.

9. The method of claim 8, wherein the group-based communication system data item is a group-based communication system message.

10. The method of claim 8, further comprising:
receiving, from the user of the third-party integrated application via the third-party integrated application, an interaction with the embeddable content; and
updating the group-based communication system based on the interaction.

11. The method of claim 8, wherein the group-based communication system data item is a group-based communication system channel.

12. The method of claim 8, wherein the unique identifier comprises: a protocol, a domain, and a path that uniquely identifies the group-based communication system content.

13. The method of claim 8, wherein the authentication token comprises an API token.

14. The method of claim 13, wherein the API token further comprises a session cookie.

15. A system comprising at least one processor and at least one non-transitory memory storing computer executable instructions that when executed by the processor cause the system to carry out actions comprising:
receiving, from a third-party integrated application that is separate and distinct from a group-based communication system hosting group-based communication system content, a request for embeddable content corresponding to a group-based communication system data item, the request comprising:
a unique identifier corresponding to the group-based communication system data item; and
an authentication token associated with a user of the third-party integrated application;
in response to determining that the authentication token is valid for the user of the third-party integrated application, evaluating authorization information for the user of the third-party integrated application; and
providing, to the third-party integrated application, the embeddable content corresponding to the group-based communication system data item, based at least in part on the authorization information for the user of the third-party integrated application,
wherein the embeddable content is interactive content.

16. The system of claim 15, wherein the group-based communication system data item is a group-based communication system message.

17. The system of claim 15, wherein the actions further comprise:
receiving, from the user of the third-party integrated application via the interactive application, an interaction with the embeddable content; and
updating the group-based communication system based on the interaction.

18. The system of claim 15, wherein the group-based communication system data item is a group-based communication system channel.

19. The system of claim 15, wherein the unique identifier comprises: a protocol, a domain, and a path that uniquely identifies the group-based communication system content item.

20. The system of claim 19, wherein the authentication token comprises an API token.

* * * * *